US009750236B1

(12) United States Patent
Diaz

(10) Patent No.: US 9,750,236 B1
(45) Date of Patent: Sep. 5, 2017

(54) VERTICAL TACKLE STORAGE BOX

(71) Applicant: Fermin A. Diaz, Naples, FL (US)

(72) Inventor: Fermin A. Diaz, Naples, FL (US)

( * ) Notice: Subject to any disclaimer, the term of this patent is extended or adjusted under 35 U.S.C. 154(b) by 269 days.

(21) Appl. No.: 14/536,743

(22) Filed: Nov. 10, 2014

(51) Int. Cl.
*A01K 97/00* (2006.01)
*A01K 97/06* (2006.01)

(52) U.S. Cl.
CPC .................... *A01K 97/06* (2013.01)

(58) Field of Classification Search
CPC .................................................. A01K 97/06
USPC .............. 43/54.1, 588.1, 57.1; 206/566, 6.1, 206/315.11; 244/920
See application file for complete search history.

(56) References Cited

U.S. PATENT DOCUMENTS

| 2,474,752 | A | * | 6/1949 | Montgomery | A01K 97/06 190/16 |
|---|---|---|---|---|---|
| 2,608,459 | A | | 8/1952 | Malmquist | |
| 3,336,693 | A | | 8/1967 | Lussier | |
| 3,461,599 | A | * | 8/1969 | Sylvester | A01K 97/06 43/57.1 |
| 3,481,066 | A | * | 12/1969 | Woolworth | A01K 97/06 312/200 |
| D266,115 | S | * | 9/1982 | Glenn, Sr. | D3/295 |
| 4,770,327 | A | | 9/1988 | Fortson | |
| 4,848,585 | A | * | 7/1989 | Snyder | A45C 11/16 206/315.11 |
| 4,848,586 | A | * | 7/1989 | Jasik | A47F 7/02 206/495 |
| 5,157,862 | A | | 10/1992 | Companiony | |
| D348,155 | S | * | 6/1994 | McCreary | D3/295 |
| 5,386,662 | A | | 2/1995 | Vader et al. | |
| 5,931,319 | A | * | 8/1999 | Murphy | A47F 7/02 211/85.2 |
| 7,621,074 | B2 | | 11/2009 | Glidewell et al. | |
| 8,016,106 | B2 | | 9/2011 | Schmitt | |
| 8,205,376 | B1 | | 6/2012 | Hughes | |
| D707,990 | S | * | 7/2014 | Bezborodko | D6/663 |
| 2004/0074137 | A1 | | 4/2004 | Levy | |
| 2006/0180481 | A1 | * | 8/2006 | McGaughey | A47F 7/02 206/6.1 |
| 2013/0293081 | A1 | * | 11/2013 | Allard | F25D 23/087 312/405 |
| 2014/0246338 | A1 | * | 9/2014 | Robby | A47F 7/02 206/6.1 |

* cited by examiner

*Primary Examiner* — Cassandra Davis
(74) *Attorney, Agent, or Firm* — Livingston Loeffler, P.A.; Edward M. Livingston, Esq.; Bryan L. Loeffler, Esq.

(57) ABSTRACT

A vertical tackle box (1) in which leaders, lures and other fishing tackle may be hung in a vertical position from hooks (14) or pegs and further secured with straps or elastomeric cords (17) on opposing sides of the vertical tackle box. Flexible access covers (18) are preferably attached to the vertical tackle box by hinges (19) along upper edges to allow each access cover to be opened and folded back over the top of the vertical tackle box, thereby fully displaying the leaders, lures or other fishing tackle stored therein.

1 Claim, 4 Drawing Sheets

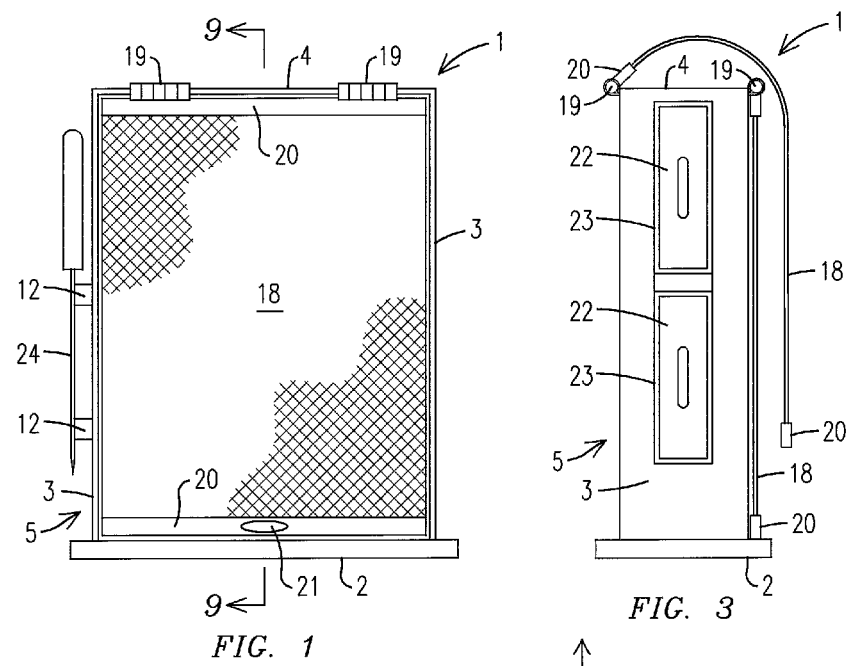
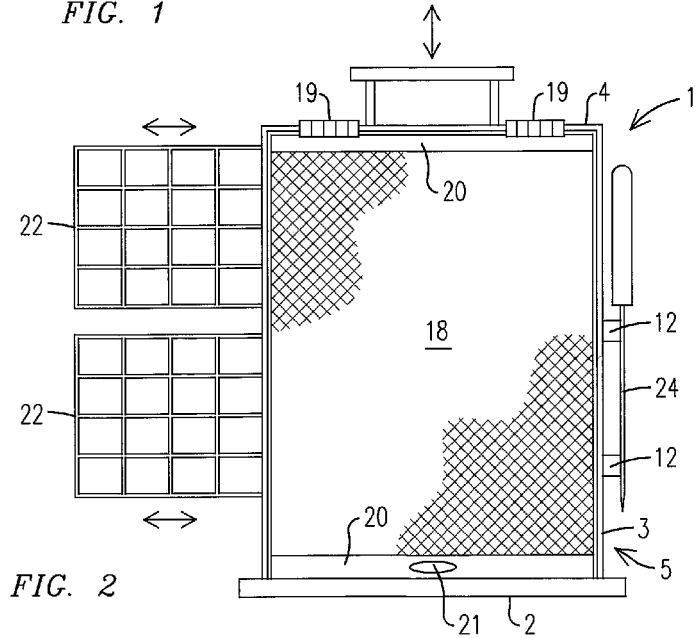
FIG. 1
FIG. 3
FIG. 2

VERTICAL TACKLE STORAGE BOX

FIELD OF THE INVENTION

This invention relates to fishing and tackle boxes, and more particularly to a vertical tackle box that provides a system for organizing, storing, displaying and carrying a plurality of fishing leaders, lures and other fishing tackle.

BACKGROUND OF THE INVENTION

Fishing tackle boxes have always been an essential piece of an angler's equipment. Conventional tackle boxes are similar to tool boxes having a main housing, a hinged lid and trays for holding tackle, lures and fishing leaders. Anglers commonly have a problem with storing leader lines in conventional tackle boxes and with keeping the contents of conventional tackle boxes clean and free of rust and corrosion.

Fishing leaders are a commonly used fishing tool. They consist of a relatively short length of wire or other suitable material attached at one end to a hook and at the opposite end to a swivel, which is designed to be tied to or attached to a clip on an end of the fishing line. Accordingly, a person may have numerous hooks and lures readily pre-prepared on leaders for quick and easy attachment to fishing line in order to save time while fishing. The primary difficulty when using a fishing leader involves organizing the leaders so each one can be easily accessed. All too often, the fishing leaders become a tangled mess and cannot be detangled. Even when an organizer of some sort is utilized to hold the fishing leaders, it is usually haphazardly placed within the tackle box such that it will bounce around and become tangled with other hooks and fishing tackle found within the tackle box.

Therefore, a need exists for an improved tackle box that provides a neat and orderly system for organizing and storing a plurality of fishing leaders, lures and other tackle such that they will be easily accessible and not be susceptible to becoming tangled.

The relevant prior art includes the following references:

| Pat. No. (U.S. Patent References) | Inventor | Issue/Publication Date |
| --- | --- | --- |
| 2,608,459 | Malmquist | Aug. 26, 1952 |
| 3,336,693 | Lussier | Aug. 22, 1967 |
| 4,770,327 | Fortson | Sep. 13, 1988 |
| 5,157,862 | Companiony | Oct. 27, 1992 |
| 5,386,662 | Vader et al. | Feb. 07, 1995 |
| 2004/0074137 | Levy | Apr. 22, 2004 |
| 7,621,074 | Glidewell et al. | Nov. 24, 2009 |
| 8,016,106 | Schmidt | Sep. 13, 2011 |
| 8,205,376 | Hughes | Jun. 26, 2012 |

SUMMARY OF THE INVENTION

The primary object of the present invention is to provide a vertical tackle box that provides a neat and orderly system for organizing and storing a plurality of fishing leaders, lures and other fishing tackle so that they will be easily accessible and not susceptible to becoming tangled.

An additional object of the present invention is to provide a vertical tackle box in which the interior is completely visible at all times so a user can easily view and find objects stored therein.

An additional object of the present invention is to provide a vertical tackle box that stores fishing leaders, lines, monofilament, lures and other fishing tackle in a vertical open position wherein the fishing leaders, lines, monofilament, lures and other tackle can be easily washed and sprayed down to remove debris and salt water.

An additional object of the present invention is to provide a vertical tackle box that stores fishing leaders, lures and other tackle in a vertical open position wherein the fishing leaders, lures and other tackle are capable of rinsed and easily dried to prevent rust and corrosion.

An additional object of the present invention is to provide a vertical tackle box that may be employed in other uses, such as a medical equipment storage box, tool box and so forth.

The present invention fulfills the above and other objects by providing a vertical tackle box in which leaders, lures and other fishing tackle may be hung in a vertical position from hooks or pegs and further secured with straps or elastomeric cords on opposing sides of the tackle box. Flexible access covers are preferably attached to the vertical tackle box by hinges along upper edges to allow each access cover to be opened and folded back over the top of the vertical tackle box, thereby fully displaying the leaders, lures or other fishing tackle stored therein. The covers are preferably constructed from a flexible mesh material to allow the interior of the vertical tackle box to be rinsed and dried and to allow users to see inside the vertical tackle box even when the covers are closed.

The vertical tackle box also may have drawers or storage containers that insert into side openings of the vertical tackle box located between the opposing sides of the tackle box. Attachment points may also be located on one or more sides of the tackle box to attach and store tools, knives and so forth.

The vertical tackle box is preferably constructed out of water proof and/or water resistant materials to allow the vertical tackle box to be a completely washable unit. This allows a user to spray down the inside of the tackle box with the leaders, lures or other fishing tackle stored therein and then leave it to dry without removing any of the leaders, lures or other fishing tackle stored therein as would be necessary with conventional tackle boxes. All components of the vertical tackle box are preferably constructed from rust proof and/or rust resistant materials.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a front view of a vertical tackle box of the present invention;

FIG. 2 is a partially exploded rear view of a vertical tackle box of the present invention;

FIG. 3 is a right side view of a vertical tackle box of the present invention;

DESCRIPTION OF THE PREFERRED EMBODIMENTS

Figure 9:
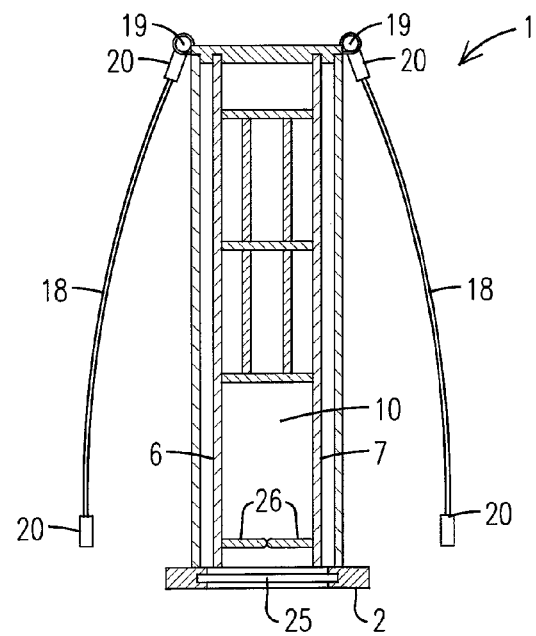
FIG. 9 is a side cross sectional view along lines 9-9 of FIG. 4.

For purposes of describing the preferred embodiment, the terminology used in reference to the numbered accessories in the drawings is as follows:
1. vertical tackle box, generally
2. horizontal base
3. vertical side wall
4. horizontal top panel
5. housing
6. front storage panel
7. rear storage panel
8. outer edge vertical side wall
9. outer edge of horizontal top panel
10. internal storage area
11. aperture
12. attachment point
13. storage means
14. hook
15. strip of hooks
16. slotted spacer
17. elastomeric cord
18. access cover
19. hinge
20. cross piece
21. pull
22. storage container
23. storage area
24. knife
25. access door
26. gasket
27. lower edge of storage panel
28. hook portion
29. peg
30. elongated member
31. front surface of elongated member
32. vertical slot
33. groove
34. strip of loops With reference to FIGS. 1 through 6, the vertical tackle box 1 of the present invention comprises a horizontal base 2 that supports vertical side walls 3 and a horizontal top panel 4 that creates a substantially rectangular-shaped housing 5. A front storage panel 6 and a rear storage panel 7 are preferably recessed within the vertical side walls 3 and horizontal top panel 4 a predetermined distance from outer edges 8 of the vertical side walls 3 and outer edges 9 of the horizontal top panel 4. In addition, the front storage panel 6 and a rear storage panel 7 preferably are spaced apart, thereby creating an internal storage area 10 within the housing 5 (as illustrated in FIG. 9). The front storage panel 6 and a rear storage panel 7 are preferably peg board and/or have a plurality of apertures 11 or attachment points 12 to attach various storage means 13 used for securing leaders, lures or other fishing tackle to the front storage panel 6 and a rear storage panel 7. Storage means 13 may include hooks 14, strips of hooks 15, slotted spacers 16, elastomeric cords 17 or bands and so forth. This provides flexibility and a multitude of storage configurations to meet an individual user's specific needs.

Access covers 18 are preferably attached to the vertical tackle box 1 by one or more hinges 19 located along the outer edges 9 of the horizontal top panel 4 to allow the front storage panel 6 or rear storage panel 7 of the vertical tackle box 1 to be opened. The access covers 18 are preferably constructed from a flexible material that can be lifted upward and folded backward over the horizontal top panel 4. The flexible material may be screen or other mesh-like material that allows a user to view the contents stored in the vertical tackle box 1 and allows for air flow into the vertical tackle box 1. The access covers 18 may be reinforced by framing or cross pieces 20 and have handles or pulls 21 used for opening the access covers 18. The access covers 18 may be held in a closed position via a securing means, such as a latch, pressure fit and so forth.

The vertical tackle box 1 may also comprise drawers or storage containers 22 that insert into the internal storage area 10 within the housing 5 through side openings 23 located on one or both of the vertical side walls 3 (as illustrated in FIG. 9). In addition, attachment points 12 may also be located on one or both of the vertical side walls 3 of the vertical tackle box 1 to attach and store tools, knives 24 and so forth. Said storage containers 22 may be used for storing smaller articles, such as hooks and weights or may be used as first aid kits and so forth.

Figure 4:
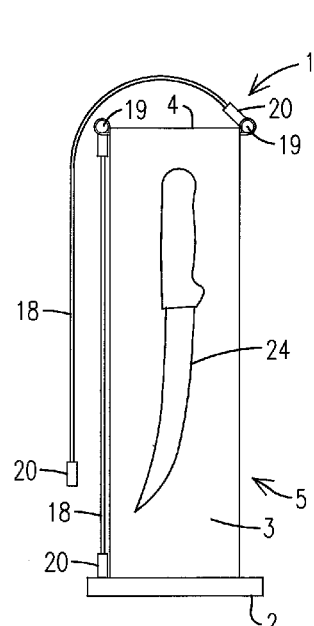
FIG. 4 is a left side view of a vertical tackle box of the present invention.
Figure 7:
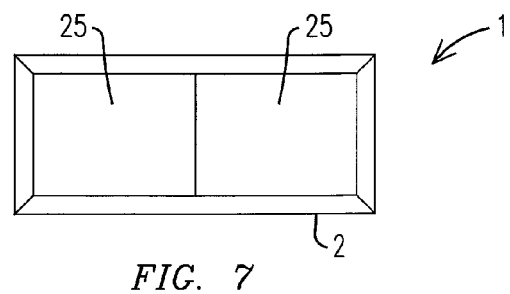
FIG. 7 is a bottom view of a horizontal base of the vertical tackle box of the present invention in a closed position.
Figure 8:
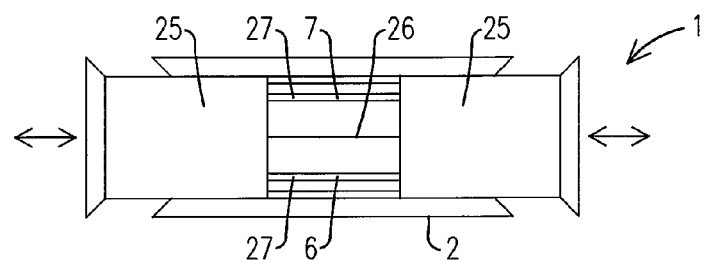
FIG. 8 is a bottom view of a horizontal base of the vertical tackle box of the present invention in an open position.

With reference to FIGS. 7-9, a bottom view of a horizontal base 2 of the vertical tackle box 1 of the present invention in a closed position and an open position, respectively, and a side cross sectional view along lines 9-9 of FIG. 4. are illustrated. The horizontal base 2 comprises an access door 25 for accessing the internal storage area 10 located between the front storage panel 6 and the rear storage panel 7. A gasket 26 is located between the front storage panel 6 and the rear storage panel 7 a predetermined distance from lower edges 27 of the front storage panel 6 and the rear storage panel 7. The gasket 26 holds loose or untied ends of leader lines within the internal storage area 10 to prevent tangling. To store a leader line in the vertical tackle box 1, a swivel located on one end of the leader line is placed on a hook 14 or other storage means 13 located on the front storage panel 6 or the rear storage panel 7. Then, the leader line is further secured using one or more slotted spacers 16 and elastomeric cords 17 or bands located on the front storage panel 6 or the rear storage panel 7. Finally, the loose or untied end of the leader line is wrapped around the lower edge 27 of the front storage panel 6 or the rear storage panel 7 and placed through the gasket 26. The gasket 26 holds the leader line in place with a self sealing pressure fit and/or friction fit.

Figure 10:
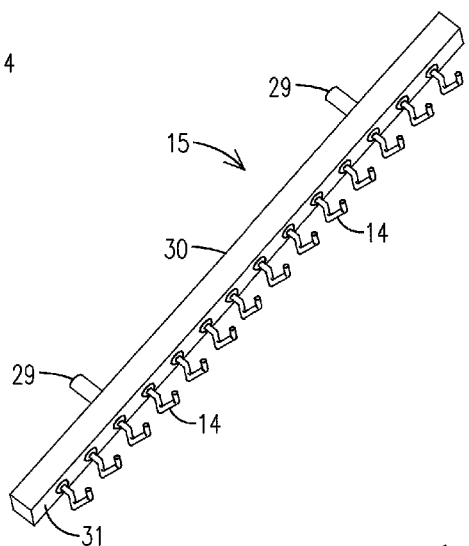
FIG. 10 is a perspective side view of a single hook used for attaching and organizing leaders and fishing lures on the front storage panel and/or rear storage panel of the present invention.

With reference to FIG. 10, a perspective side view of a single hook 14 used for attaching and organizing leaders and fishing lures on the front storage panel 6 and/or rear storage panel 7 of the present invention is illustrated. The hook 14 comprises a curved and/or angled hook portion 28 and a peg 29 for insertion into one of the apertures 11 located on the front storage panel 6 and/or rear storage panel 7. The hook 14 or a plurality of hooks 14 may be temporarily attachable to the front storage panel 6 and/or rear storage panel 7 and/or permanently attached to the front storage panel 6 and/or rear storage panel 7.

Figure 11:
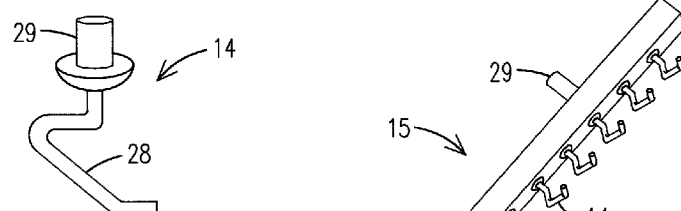
FIG. 11 is a perspective side view of a strip of hooks used for attaching and organizing leaders on the front storage panel and/or rear storage panel of the present invention.

With reference to FIG. 11, a perspective side view of a strip of hooks 15 used for attaching and organizing leaders on the front storage panel 6 and/or rear storage panel 7 of the present invention is illustrated. The strip of hooks 14 comprises an elongated member 30 that may be temporarily attachable to the front storage panel 6 and/or rear storage panel 7 via pegs 29 located on a rear surface and/or permanently attached to the front storage panel 6 and/or rear storage panel 7. A plurality of hooks 14 are spaced across a front surface 31 of the elongated member 30.

Figure 12:
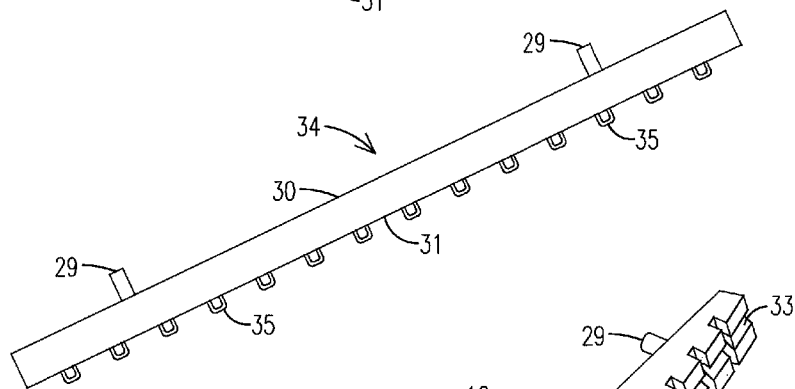
FIG. 12 is a perspective side view of a slotted spacer used for attaching and organizing leaders on the front storage panel and/or rear storage panel of the present invention.

With reference to FIG. 12, a perspective side view of a strip of loops 34 used for attaching and organizing leaders on the front storage panel 6 and/or rear storage panel 7 of the present invention is illustrated. The strip of hooks 34 comprises an elongated member 30 that may be temporarily attachable to the front storage panel 6 and/or rear storage panel 7 via pegs 29 located on a rear surface and/or permanently attached to the front storage panel 6 and/or rear storage panel 7. A plurality of loops 35 are spaced across a front surface 31 of the elongated member 30.

Figure 5:
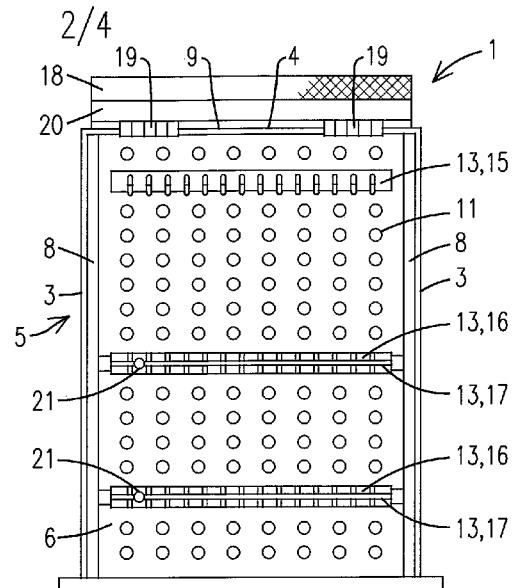
FIG. 5 is a front view of a vertical tackle box of the present invention in an open position.
Figure 6:
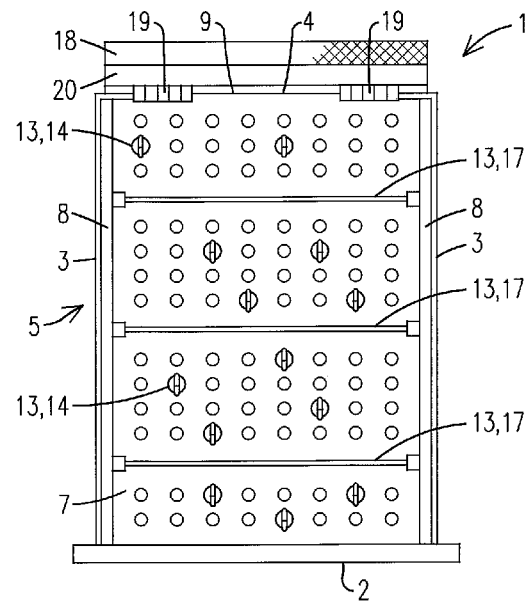
FIG. 6 is a rear view of a vertical tackle box of the present invention in an open position.
Figure 13:
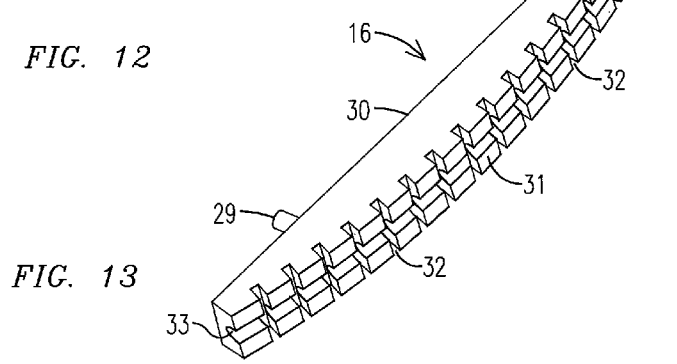
FIG. 13 is a perspective side view of a slotted spacer used for attaching and organizing leaders on the front storage panel and/or rear storage panel of the present invention.

With reference to FIG. 13, a perspective side view of a slotted spacer 16 used for attaching and organizing leaders on the front storage panel 6 and/or rear storage panel 7 of the present invention is illustrated. The slotted spacer 16 comprises an elongated member 30 that may be temporarily attachable to the front storage panel 6 and/or rear storage panel 7 via pegs 29 located on a rear surface and/or permanently attached to the front storage panel 6 and/or rear storage panel 7. A plurality of vertical slots 32 are spaced apart across a front surface 31 of the elongated member 30. A groove 33 is located length wise from end to end on the front surface 31 of the elongated member 30 intersecting each of the vertical slots 32. The groove 33 accommodates an elastomeric cord 17, such as a bungee cord or flat elastomeric band, which has each end secured to the vertical tackle box 1. The elastomeric cords 17 may be removeably attached to the vertical tackle box to allow the storage configuration to be reconfigured. The elastomeric cord 17 is then stretched across the front surface 31 of the elongated member 30 and held in position by the groove 33 (as illustrated in FIG. 6). The front surface 31 of the elongated member 30 is preferably curved outward, thereby ensuring the elastomeric cord 17 maintains contact across the entire front surface 31 of the elongated member 30. The constant contact ensures that each leader placed in each vertical slot 32 of the slotted spacer 16 is held firmly in place with equal pressure. A sliding pull 34 may be located on the elastomeric cord 17 (as illustrated in FIG. 5) to make it easier to pull the elastomeric cord 17 out of the groove 33 when placing leaders into the slotted spacer 16 or removing leaders from the slotted spacer 16.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A vertical tackle box comprising:
   a horizontal base that supports vertical side walls and a horizontal top panel that all create a substantially rectangular-shaped housing;
   at least one storage panel having at least one storage means located thereon;
   said at least one storage panel comprises a front storage panel and a rear storage panel;
   said front storage panel and said rear storage panel are spaced apart, thereby creating an internal storage area within the housing; and
   an access door located on the horizontal base for accessing the internal storage area.

* * * * *